United States Patent
Ling et al.

(10) Patent No.: US 12,172,492 B2
(45) Date of Patent: Dec. 24, 2024

(54) INTAKE STRUCTURE

(71) Applicant: HIGHLY MARELLI UK LIMITED, Salford (GB)

(72) Inventors: Richard Ling, Salford (GB); Vijay Salunke, Salford (GB)

(73) Assignee: HIGHLY MARELLI UK LIMITED, Greater Manchester (GB)

( * ) Notice: Subject to any disclaimer, the term of this patent is extended or adjusted under 35 U.S.C. 154(b) by 0 days.

(21) Appl. No.: 17/769,660

(22) PCT Filed: Oct. 18, 2019

(86) PCT No.: PCT/EP2019/078344
§ 371 (c)(1),
(2) Date: Apr. 15, 2022

(87) PCT Pub. No.: WO2021/073749
PCT Pub. Date: Apr. 22, 2021

(65) Prior Publication Data
US 2024/0149635 A1    May 9, 2024

(51) Int. Cl.
*B60H 1/24*    (2006.01)
*B60H 1/00*    (2006.01)

(52) U.S. Cl.
CPC ..... *B60H 1/00671* (2013.01); *B60H 1/00021* (2013.01)

(58) Field of Classification Search
CPC ............ B60H 1/00671; B60H 1/00849; B60H 1/00021; B60H 1/00028; B60H 2001/00085; B60H 2001/00092
(Continued)

(56) References Cited

U.S. PATENT DOCUMENTS

| | | | |
|---|---|---|---|
| 9,676,245 | B2 | 6/2017 | Clemence et al. |
| 9,925,844 | B2 | 3/2018 | Kehimkar et al. |

(Continued)

FOREIGN PATENT DOCUMENTS

| | | |
|---|---|---|
| CN | 1539661 A | 10/2004 |
| CN | 203258816 U | 10/2013 |

(Continued)

OTHER PUBLICATIONS

CN Office Action issued in corresponding Chinese Patent Application No. 201980101302.9 A dated Oct. 11, 2023 (26 pages).

(Continued)

*Primary Examiner* — Ko-Wei Lin
(74) *Attorney, Agent, or Firm* — FOLEY & LARDNER LLP

(57) ABSTRACT

An intake structure (1*a*) for an air-conditioning system (100). The intake structure (1) comprises a case (10), a first door (20*a*), a second door (30*a*) and an airflow regulator (40). The case (10) defines a mixing chamber (11) comprising a first inlet aperture (12), a second inlet aperture (13), a third inlet aperture (14), and an outlet aperture (15). The first door (20*a*) is configured to prevent airflow through the first inlet aperture (12) in a first inlet aperture closed position and allow airflow through the first inlet aperture (12) and prevent airflow through the mixing chamber from the third inlet aperture (14) to the first inlet aperture (12) in a first inlet aperture open position. The second door (30*a*) is configured to prevent airflow through the second inlet aperture (13) and allow airflow through the third inlet aperture (14) in a second inlet aperture closed position and allow airflow through the second inlet aperture (13) and prevent airflow through the third inlet aperture (14) in a third inlet aperture closed position. The airflow regulator selectively regulates a flow rate of airflow through the third inlet aperture (14) when the (Continued)

second door (20a) is in the second inlet aperture closed position.

13 Claims, 11 Drawing Sheets

(58) Field of Classification Search
USPC .................................................. 454/152, 155
See application file for complete search history.

(56) References Cited

U.S. PATENT DOCUMENTS

| | | | | |
|---|---|---|---|---|
| 11,458,806 B2* | 10/2022 | Haupt | ................ | B60H 1/00857 |
| 2012/0214394 A1* | 8/2012 | Kanemaru | ......... | B60H 1/00678 |
| | | | | 454/139 |
| 2015/0017899 A1* | 1/2015 | Kim | .................. | B60H 1/00785 |
| | | | | 454/75 |
| 2015/0044958 A1* | 2/2015 | Kehimkar | .......... | B60H 1/00849 |
| | | | | 454/143 |
| 2016/0144688 A1* | 5/2016 | Kim | ................... | B60H 1/00028 |
| | | | | 454/143 |
| 2018/0072131 A1* | 3/2018 | Lee | ........................ | B60S 1/023 |
| 2019/0054799 A1* | 2/2019 | Wijaya | ............... | B60H 1/00849 |
| 2019/0315196 A1* | 10/2019 | Lee | ........................ | B60H 1/241 |

FOREIGN PATENT DOCUMENTS

| | | |
|---|---|---|
| CN | 104602929 A | 5/2015 |
| CN | 207257295 U | 4/2018 |
| CN | 109398022 A | 3/2019 |
| DE | 102005043502 A1 | 3/2007 |
| EP | 3444133 A2 | 2/2019 |
| KR | 1020150022192 A | 3/2015 |
| WO | WO 02092367 A1 | 11/2002 |
| WO | WO-2019/194493 A1 | 10/2019 |

OTHER PUBLICATIONS

International Search Report and Written Opinion for PCT/EP2019/078344, mailed Aug. 18, 2020, 10 pages.

* cited by examiner

INTAKE STRUCTURE

TECHNICAL FIELD

The present disclosure relates to an intake structure for an air-conditioning system. More particularly, the present disclosure relates to an intake structure for an air-conditioning system to be used in a vehicle.

BACKGROUND

A vehicle may incorporate an air-conditioning system to provide comfort to passengers in a passenger compartment of the vehicle. For example, the air-conditioning system may be a heating, ventilation and air-conditioning (HVAC) system, whereby air is heated or cooled before delivery to the passenger compartment of the vehicle. Heating of air may be performed using a heating element, such as a heat exchanger, whereby heat from exhaust gases (e.g. from an internal combustion engine) or hot water (e.g. engine cooling water, heated using electric power from a battery or a fuel cell) is transferred to the air as it passes through the heat exchanger. Cooling of air may be performed using an evaporator, whereby the air is cooled by transferring heat in the air to a coolant in the evaporator.

Typically, an air-conditioning system includes a blower which draws air into the air-conditioning system through an intake. The intake may include one or more inlet apertures, through which air may enter the intake for subsequent heating or cooling by the air-conditioning system. For example, the intake may include an inlet aperture for intake of air from outside the vehicle and a separate inlet aperture for intake of air from inside the vehicle. Examples of such intakes are disclosed in U.S. Pat. Nos. 9,925,844 B2 and 9,676,245 B2.

SUMMARY

According to a first aspect of the present disclosure, an intake structure for an air-conditioning system comprises: a case defining a mixing chamber comprising a first inlet aperture, a second inlet aperture, a third inlet aperture, and an outlet aperture; a first door moveable between a first inlet aperture closed position and a first inlet aperture open position; a second door moveable between a second inlet aperture closed position and a third inlet aperture closed position; and an airflow regulator for regulating a flow rate of airflow through the third inlet aperture; wherein: the first door is configured to prevent airflow through the first inlet aperture in the first inlet aperture closed position, and allow airflow through the first inlet aperture and prevent airflow through the mixing chamber from the third inlet aperture to the first inlet aperture in the first inlet aperture open position; the second door is configured to prevent airflow through the second inlet aperture and allow airflow through the third inlet aperture in the second inlet aperture closed position, and allow airflow through the second inlet aperture and prevent airflow through the third inlet aperture in the third inlet aperture closed position; and the airflow regulator is configured to selectively regulate the flow rate of airflow through the third inlet aperture when the second door is in the second inlet aperture closed position.

In some embodiments, the intake structure further comprises an actuator system configured to actuate the first door and the second door in accordance with a first mode, a second mode and a third mode, wherein: in the first mode, the first door is in the first inlet aperture closed position and the second door is in the second inlet aperture closed position, such that airflow through the mixing chamber from the third inlet aperture to the outlet aperture is allowed and airflow through the first inlet aperture and the second inlet aperture is prevented; in the second mode, the second door is in the third inlet aperture closed position, such that airflow through the mixing chamber from the second inlet aperture to the outlet aperture is allowed and airflow through the third inlet aperture is prevented; and in the third mode, the first door is in the first inlet aperture open position and the second door is in the second inlet aperture closed position, such that airflow through the mixing chamber from the first inlet aperture and the third inlet aperture to the outlet aperture is allowed, airflow through the second inlet aperture is prevented, and airflow through the mixing chamber from the third inlet aperture to the first inlet aperture is prevented.

In some embodiments, the first door is a rotary door which is rotatable between the first inlet aperture closed position and the first inlet aperture open position, the rotary door comprising: a blocking surface configured to block the first inlet aperture in the first inlet aperture closed position; and a support structure which supports the blocking surface and is rotatable around a rotation axis distal from the blocking surface; wherein the rotation axis is located closer to the outlet aperture than to the first inlet aperture.

In some embodiments, the second door is a rotary door which is rotatable between the second inlet aperture closed position and the third inlet aperture closed position, the rotary door comprising: a blocking surface configured to block the second inlet aperture in the second inlet aperture closed position and block the third inlet aperture in the third inlet aperture closed position; and a support structure which supports the blocking surface and is rotatable around a rotation axis distal from the blocking surface; wherein the rotation axis is located closer to the outlet aperture than to the second inlet aperture.

In some embodiments, the blocking surface comprises a planar portion which is orthogonal to a radial direction from the rotation axis.

In some embodiments, the support structure together with the blocking surface is triangular or fan-shaped in cross-section.

In some embodiments, the blocking surface comprises a circular arcuate surface which is coaxial with the rotation axis.

In some embodiments, the first door is a cantilever door which is rotatable between the first inlet aperture closed position and the first inlet aperture open position, wherein the cantilever door is rotatable around a rotation axis located adjacent to the case and between the first inlet aperture and the second inlet aperture.

In some embodiments, the second door is a cantilever door which is rotatable between the second inlet aperture closed position and the third inlet aperture closed position, wherein the cantilever door is rotatable around a rotation axis located adjacent to the case and between the second inlet aperture and the third inlet aperture.

In some embodiments, the second door is configured to: block the second inlet aperture in the second inlet aperture closed position to prevent airflow through the second inlet aperture; and block the third inlet aperture in the third inlet aperture closed position to prevent airflow through the third inlet aperture.

In some embodiments, the case is configured to accommodate an air filter in the outlet aperture, wherein the first door is configured extend from the case to the air filter to partition the mixing chamber and prevent airflow through the mixing chamber from the third inlet aperture to the first inlet aperture in the first inlet aperture open position.

In some embodiments, the first door comprises a sealing member configured to abut the air filter in the first inlet aperture open position to prevent airflow between the first door and the air filter.

In some embodiments, the airflow regulator comprises a RAM door, the RAM door being moveable between: a first RAM door position which provides minimum regulation of airflow through the third inlet aperture; and a second RAM door position which provides maximum regulation of airflow through the third inlet aperture; wherein the RAM door does not prevent airflow through the third inlet aperture in the first RAM door position and in the second RAM door position.

In some embodiments, the airflow regulator is located in an intake duct defined by the case at a position which does not interfere with the second door in the third inlet aperture closed position.

According to a second aspect of the present disclosure, an air-conditioning system for a vehicle, the air-conditioning system comprising the intake structure according to the first aspect is provided, wherein the first inlet aperture and the second inlet aperture are configured to receive airflow from inside the vehicle and the third inlet aperture is configured to receive airflow from outside the vehicle.

BRIEF DESCRIPTION OF THE DRAWINGS

Embodiments of the present disclosure will be described with reference to the accompanying drawings, in which.

DETAILED DESCRIPTION

Figure 1:
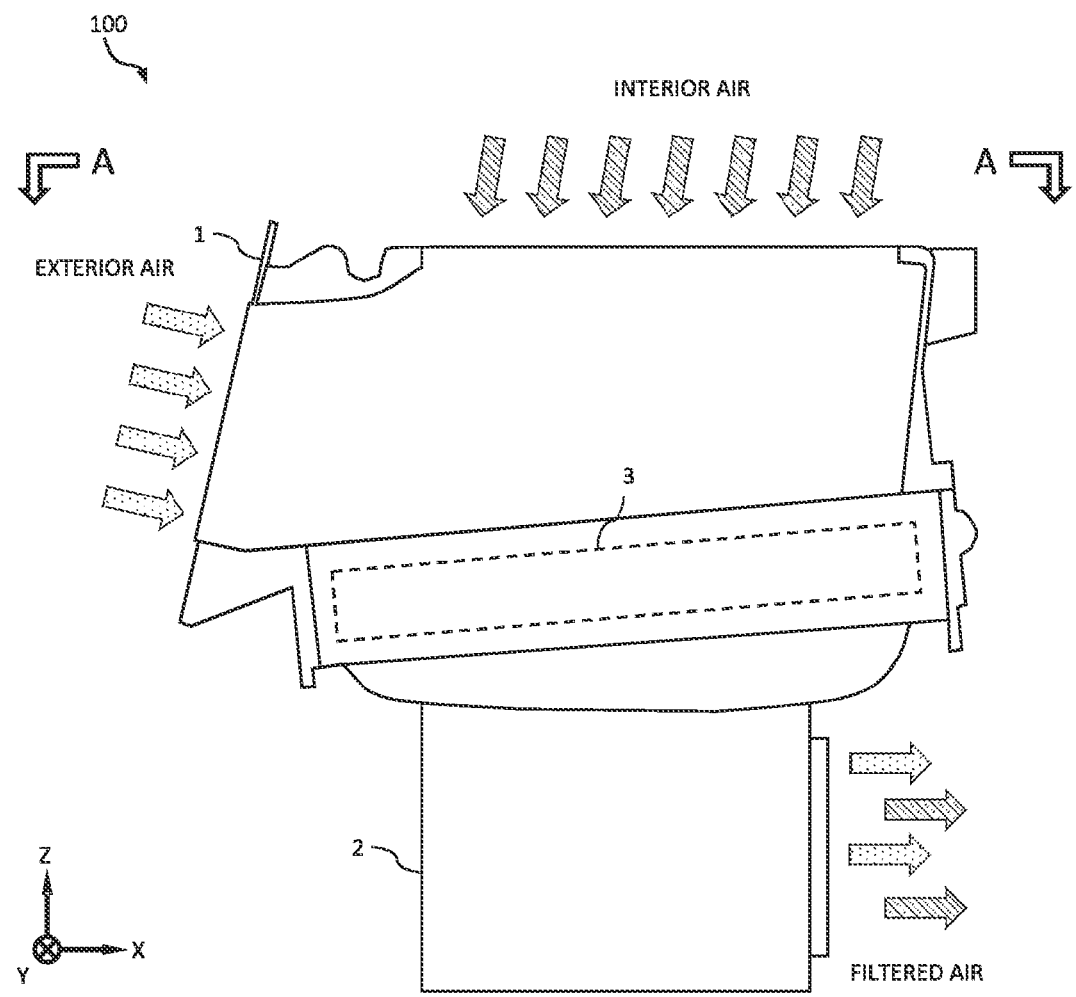
FIG. 1 is schematic diagram showing an air-conditioning system comprising an intake structure according to embodiments of the present disclosure.

Various embodiments and examples according to the present disclosure will be described with reference to the accompanying drawings. Features which are common to two or more embodiments are indicated in the drawings with the same reference signs for clarity and conciseness.

FIG. 1 shows an example of an air-conditioning system 100 for use in a vehicle (not shown). The air-conditioning system 100 may be part of a heating, ventilation and air-conditioning (HVAC) system for conditioning of air within a passenger compartment of the vehicle. The air-conditioning system 100 comprises an intake structure 1, a blower 2, and an air filter 3. The blower 2 draws air into the air-conditioning system 100 via the intake structure 1 and draws the air through the air filter 3 before subsequent delivery to the passenger compartment of the vehicle. Typically, the blower 2 includes a fan (not shown) which generates a negative pressure differential to draw air into the intake structure 1 and through the air filter 3. In some examples, the air-conditioning system 100 may comprise a heat-exchanger (not shown) and/or an evaporator (not shown) for heating or cooling the air before it is delivered to the passenger compartment of the vehicle.

When the air-conditioning system 100 is employed in the vehicle, the intake structure 1 may be configured to draw air from outside the vehicle (hereinafter termed "exterior air") and air from inside the vehicle (hereinafter termed "interior air"). Such interior air may, for example, include air drawn from the passenger compartment of the vehicle. In the drawings, the flow of exterior air is indicated by arrows with a dotted fill-pattern and the flow of interior air is indicated by arrows with a cross-hatched fill-pattern. The interior air and the exterior air travels through the intake structure 1, before passing through the air filter 3 for subsequent ventilation to the passenger compartment of the vehicle (hereinafter termed "filtered air").

To ensure comfort for passengers within the vehicle compartment of the vehicle and to ensure efficient operation of the air-conditioning system 100, it is desirable to prevent exterior air from being ventilated directly into the passenger compartment via the intake structure 1. Exterior air which is ventilated directly into the passenger compartment does not pass through the air filter 3 (i.e. such air bypasses the air filter 3) and thus may transport contaminants, such as particulate matter, pollen or vehicle exhaust gases, into the passenger compartment of the vehicle. Moreover, exterior air which is ventilated directly to the passenger compartment via the intake structure 1 is not subject to heating or cooling by the air-conditioning system 100, which may lead to a significant reduction in energy efficiency of the air-conditioning system 100. Embodiments of the present disclosure have been devised with regard to these problems.

Figure 2:
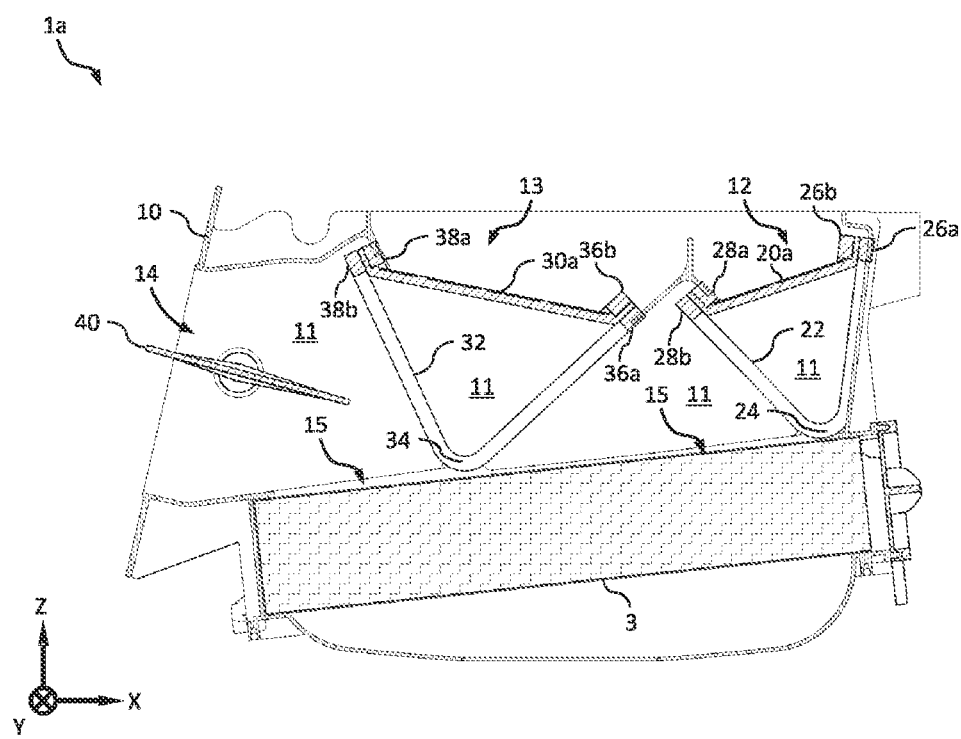
FIG. 2 is a schematic diagram showing the intake structure according to a first embodiment in cross-section.
Figure 8:
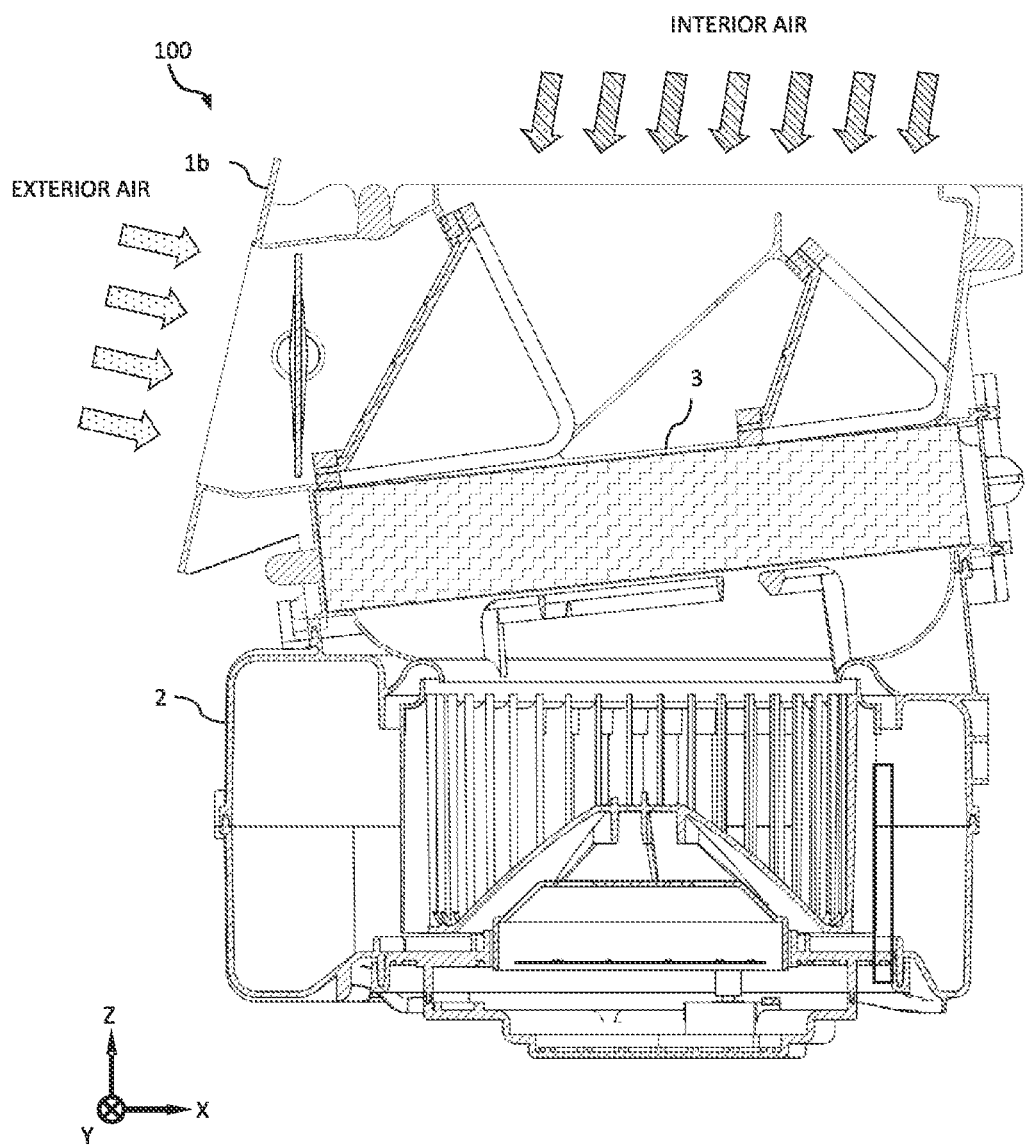
FIG. 8 is a schematic diagram showing the air conditioning system of FIG. 1 comprising the intake structure according to the first embodiment in cross-section.

An intake structure 1a in accordance with a first embodiment is shown in FIG. 2 in cross section. The intake structure 1a is for use with the air-conditioning system 100 shown in FIG. 1, as illustrated in FIG. 8 in cross-section. Specifically, FIG. 2 shows the intake structure 1a in the cross-section A-A of FIG. 1 (i.e. sectioned in the X-Z plane of FIG. 1). The intake structure 1a includes a case 10 which defines a mixing chamber 11 comprising a first inlet aperture 12, a second inlet aperture 13, a third inlet aperture 14, and an outlet aperture 15. That is, the case 10, together with the first inlet aperture 12, the second inlet aperture 13, the third inlet aperture 14 and the outlet aperture 15, define an interior volume within the intake structure 1a through which the interior air and the exterior air passes before being filtered by the air filter 3.

The case 10 may be formed from a thermosetting plastic in an injection moulding process or the like. Moreover, the case 10 may be formed as a single integral component or assembled from a plurality of constituent components. The first inlet aperture 12 and the second inlet aperture 13 are for intake of interior air into the mixing chamber 11, and thus may be connected to one or more ducts in fluidic communication with the passenger compartment of the vehicle. In contrast, the third inlet aperture 14 is for intake of exterior air into the mixing chamber 11, and thus may be connected to one or more ducts in fluidic communication with the outside of the vehicle. The outlet aperture 15 is for delivery of air from the mixing chamber 11 to the air filter 3 and subsequent heating or cooling within the air-conditioning system 100. In some embodiments, the case 10 may be configured to accommodate the air filter 3 substantively next to or within the outlet aperture 15, as shown in FIG. 2. In other embodiments, the air filter 3 may be accommodated by a different part of the air-conditioning system 100 and thus distal from the outlet aperture 15.

The intake structure 1*a* according to the first embodiment includes a first door 20*a*, a second door 30*a*, and an airflow regulator 40. The first door 20*a*, the second door 30*a* and the airflow regulator 40 cooperate to control and/or regulate the flow of interior air and exterior air into and through the mixing chamber 11.

The first door 20*a* controls the flow of interior air through the first inlet aperture 12 and is moveable between a first inlet aperture closed position (shown in FIG. 2) and a first inlet aperture open position (shown in FIG. 8). The first inlet aperture closed position and the first inlet aperture open position may also be termed the first inlet aperture closed orientation and the first inlet aperture open orientation, respectively. Airflow through the first inlet aperture 12 is prevented when the first door 20*a* is in the first inlet aperture closed position and allowed when the first door 20*a* is in the first inlet aperture open position.

The first door 20*a* comprises a first support structure 22 which is rotatable about a first rotation axis 24 (i.e. a first centre of rotation) to move the first door 20*a* between the first inlet aperture closed position and the first inlet aperture open position. The first door 20*a* includes a first surface which is configured to block airflow (i.e. a first blocking surface) through the first inlet aperture 12 when the first door 20*a* is in the first inlet aperture closed position. That is, the first surface substantively covers the first inlet aperture 12 when the first door 20*a* is in the first inlet aperture closed position. Thus, by rotation of the first support structure 22 about the first rotation axis 24, the first door 20*a* is configured to prevent airflow through the first inlet aperture 12 when in the first inlet aperture closed position and allow airflow through the first inlet aperture 12 in the first inlet aperture open position.

The first door 20*a* is also configured to prevent airflow through the mixing chamber 11 from the third inlet aperture 14 to the first inlet aperture 12 in the first inlet aperture open position. That is, in the first inlet aperture open position, the first door 20*a* extends from the case 10, at a position between the first inlet aperture 12 and the second inlet aperture 13, to the outlet aperture 15 to partition the mixing chamber 11. Thus, when the first door 20*a* is in the first inlet aperture open position, the first door 20*a* divides the mixing chamber 11 into two separate volumes and forms a barrier to block airflow between the two separate volumes. Specifically, in the first inlet aperture open position, the mixing chamber 11 is partitioned into a first volume defined by the case 10, the first inlet aperture 12, the outlet aperture 15 and the first door 20*a*, and a second volume defined by the case 10, the second inlet aperture 13, the third inlet aperture 14, the outlet aperture 15 and the first door 20*a*. In embodiments in which the air filter 3 is accommodated by the case 10 substantively next to or within the outlet aperture 15, the first door 20*a* may be configured to abut the air filter 3 in the first inlet aperture open position to partition the mixing chamber 11 as discussed above. According to this configuration, exterior air drawn into the intake structure 1*a* through the third inlet aperture 14 is prevented from being directly ventilated to the passenger compartment of the vehicle via the first inlet aperture 12 when the first door 20*a* is in the first inlet aperture open position.

The second door 30*a* controls the flow of interior air and exterior air through the second inlet aperture 13 and the third inlet aperture 14, respectively. The second door 30*a* is moveable between a second inlet aperture closed position (shown in FIG. 2) and a third inlet aperture closed position (shown in FIG. 8). The third inlet aperture closed position may also be referred to as a second inlet aperture open position and the second inlet aperture closed position may also be referred to as a third inlet aperture open position. The second inlet aperture closed position, the second inlet aperture open position, the third inlet aperture closed position and the third inlet aperture open position may also be termed the second inlet aperture closed orientation, the second inlet aperture open orientation, the third inlet aperture closed orientation and the third inlet aperture open orientation, respectively.

The second door 30*a* comprises a second support structure 32 which is rotatable about a second rotation axis 34 (i.e. a second centre of rotation) to move the second door 30*a* between the second inlet aperture closed position and the third inlet aperture closed position. The second door 30*a* includes a second surface which is configured to block airflow (i.e. a second blocking surface) through the second inlet aperture 13 when the second door 30*a* is in the second inlet aperture closed position, and block airflow through the third inlet aperture 14 when the second door 30*a* is in the third inlet aperture closed position. That is, the second surface substantively covers the second inlet aperture 13 when the second door 30*a* is in the second inlet aperture closed position, and substantively covers the third inlet aperture 14 when the second door 30*a* is in the third inlet aperture closed position. Thus, by rotation of the second support structure 32 about the second rotation axis 34, the second door 30*a* is configured to prevent airflow through the second inlet aperture 13 and allow airflow through the third inlet aperture 14 when in the second inlet aperture closed position, and allow airflow through the second inlet aperture 13 and prevent airflow through the third inlet aperture 14 when in the third inlet aperture closed position.

In the present embodiment, the first door 20*a* and the second door 30*a* are configured as rotary doors, whereby the first blocking surface and the second blocking surface are both distal from the respective first rotation axis 24 and second rotation axis 34 in the radial direction. That is, all points on the blocking surfaces are distal from the respective rotation axis. Thus, according to the present embodiment, the first rotation axis 24 and the second rotation axis 34 may be located within the mixing chamber 11 at locations which are closer to the outlet aperture 15 than respectively the first inlet aperture 12 and the second inlet aperture 13 in the Z direction shown in FIG. 2. This configuration enables the first rotation axis 24 and the second rotation axis 34 to be located at positions distal from the first inlet aperture 12 and the second inlet aperture 13, thereby enabling the size of first inlet aperture 12 and the second inlet aperture 13 to be optimised with respect to surface area of the case 10. In other words, by configuring the first door 20*a* and the second door 30*a* as rotary doors in this manner, the size of the first aperture 12 and the second aperture 13 can be maximised, thereby enabling higher flow rates of air through the intake structure 1*a* for a given air flow speed. Conversely, according to the intake structure 1*a* of the present embodiment, a specified flow rate of interior air may be drawn into the mixing chamber 11 through the intake structure 1*a* at a relatively lower air flow speed. Reduction of the air flow speed for a specified flow rate in this manner may be advantageous in terms of lower noise levels within the passenger compartment of the vehicle.

In the embodiment shown in FIG. 2, the first blocking surface of the first door 20a includes a planar portion which is orthogonal to a radial direction from the first rotation axis 24, and the first support structure 22 is substantively triangular in cross-section with its apex located substantively coincident with first rotation axis 24. Similarly, the second blocking surface of the second door 30a includes a planar portion which is orthogonal to a radial direction from the second rotation axis 34, and the second support structure 32 is substantively triangular in cross-section with its apex substantively coincident with the second rotation axis 34. Thus, for the first door 20a, all points on the first blocking surface are radially distal from the first rotation axis 24 and rotate in a circumferential direction with respect to the first rotation axis 24. Similarly, for the second door 30a all points on the second blocking surface are radially distal from the second rotation axis 34 and rotate in a circumferential direction with respect to the second rotation axis 34.

The airflow regulator 40 regulates the flow rate of airflow through the third inlet aperture 14. In particular, exterior air entering the third inlet aperture 14 may be subject to a RAM pressure due to movement of the vehicle. Moreover, the magnitude of the RAM pressure of the exterior air entering the third inlet aperture 14 may vary according to the speed at which the vehicle is travelling. Thus, the airflow regulator 40 is provided to regulate (i.e. limit) the flow rate of exterior air entering the air-conditioning system 100 via the intake structure 1a and ensure that the flow rate of filtered air ventilated to the passenger compartment of the vehicle can be controlled with precision.

In the present embodiment, the airflow regulator 40 is a RAM door. The angle of the RAM door with respect to the direction of airflow through the third inlet aperture 14 may be varied to regulate the flow rate of exterior air entering the intake structure 1a. Actuation of the RAM door may be performed manually or automatically using an actuator system (not shown). The actuator system may selectively actuate the RAM door. In FIG. 2, the RAM door is substantively parallel to the direction of airflow through the third inlet aperture 14, and thus provides negligible resistance to the flow of exterior air. When the RAM door is orientated in the Z direction (i.e. substantively vertical, as shown in FIG. 8) and the second door 30 is in the second inlet aperture closed position (i.e. the third inlet aperture open position), the RAM door is substantively perpendicular to the direction of airflow through the third inlet aperture 14, and thus provides maximum resistance to the flow of exterior air.

In the present embodiment, the RAM door is rotatable between a first RAM door position, which provides minimum regulation of airflow through the third inlet aperture 14 (i.e. as shown in FIG. 2), and a second RAM door position which provides maximum regulation (i.e. maximum attenuation) of airflow through the third inlet aperture 14 (i.e. as shown in FIG. 8). In some embodiments, the second RAM door position may not prevent airflow through the third inlet aperture 14. That is, the airflow regulator 40 is configured to regulate the flow rate of exterior air through the third inlet aperture 14 but may permit airflow through the third inlet aperture 14 even in the second RAM door position (i.e. as shown in FIG. 8). In the embodiment shown in FIG. 8, the RAM door acting as the airflow regulator 40 does not extend across the third inlet aperture 14 even when orientated substantively perpendicular to the direction of airflow through the third inlet aperture 14 (i.e. a gap is present between the RAM door and the case 10 for all orientations of the RAM door), thus permitting a minimal airflow through the third inlet aperture 14. Although such minimal airflow may be considered as negligible, such airflow through the third inlet aperture 14 may be prevented by the second door 30a in the third inlet aperture closed position, as shown in FIG. 8. By preventing airflow through the third inlet aperture 14 using the second door 30a, it is therefore possible to simplify the design of the RAM door and the case 10. For example, the RAM door does not require additional components to facilitate sealing of the third inlet aperture 14, and the geometry of the case 10 can similarly be simplified. Moreover, the simpler geometry for the case 10 facilitates the smooth flow of air into the intake structure 1a, thus reducing noise levels within the vehicle.

In some embodiments, the airflow regulator 40 (i.e. the RAM door) may be located at a position which does not interfere with movement of the second door 30a (i.e. irrespective of the orientation of the RAM door), thus allowing the airflow regulator 40 and the second door 30a to operate substantively independent of each other.

The first door 20a may be provided with one or more sealing members. For example, according to the present embodiment, the first door 20a may be provided a first sealing member 26 and a second sealing member 28. The first sealing member 26 comprises two portions 26a, 26b which are located at a first end of the first door 20a, and the second sealing member 28 comprises two portions 28a, 28b which are located at second end of the first door 20a, distal from the first end. In the first inlet aperture closed position, portion 26a of the first sealing member 26 abuts the case 10 to prevent airflow between the case 10 and the first end of the first door 20a, and portion 28a of the second sealing member 28 abuts the case 10 to prevent airflow between the case 10 and the second end of the first door 20a. In the first inlet aperture open position, portion 26b of the first sealing member 26 abuts the case 10 to prevent airflow between the case 10 and the first end of the first door 20a, and portion 28b of the second sealing member 28 abuts the air filter 3 to prevent airflow between the air filter 3 and the second end of the first door 20a.

The second door 30a may be provided with one or more sealing members. For example, according to the present embodiment, the second door 30a may be provided with a third sealing member 36 and a fourth sealing member 38. The third sealing member 36 comprises two portions 36a, 36b which are located a first end of the second door 30a, and the fourth sealing member 38 comprises two portions 38a, 38b which are located at second end of the second door 30a, distal from the first end. In the second inlet aperture closed position, portion 36a of the third sealing member 36 abuts the case 10 to prevent airflow between the case 10 and the first end of the second door 30a, and portion 38a of the fourth sealing member 38 abuts the case 10 to prevent airflow between the case 10 and the second end of the second door 30a. In the third inlet aperture closed position, portion 36b of the third sealing member 36 abuts the case 10 to prevent airflow between the case 10 and the first end of the second door 30a, and portion 38b of the fourth sealing member 38 abuts the case 10 to prevent airflow between the case 10 and the second end of the second door 30a.

According to some embodiments, the intake structure 1a is provided with an actuator system (not shown) which actuates the first door 20a and the second door 30a. In further embodiments, the actuator system may also actuate the airflow regulator 40 to regulate the flow rate of exterior air through the third inlet aperture 14. The actuator system may actuate the first door 20a and the second door 30a according to a first ventilation mode, a second ventilation mode, and a third ventilation mode, as illustrated in FIG. 3A, FIG. 3B and FIG. 3C, respectively.

Figure 3A:
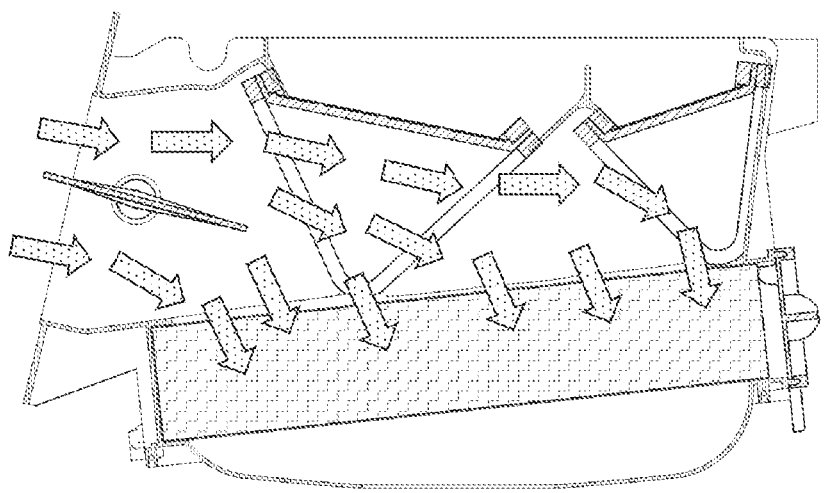
FIGS. 3A to 3C are schematic diagrams of the intake structure according to the first embodiment in a first mode, a second mode and a third mode, respectively.

FIG. 3A illustrates the intake structure 1a of the first embodiment operating in the first ventilation mode. The first ventilation mode may also be referred to as a first mode or a fresh mode. In the first ventilation mode, the actuator system moves the first door 20a to the first inlet aperture closed position and the second door 30a to the second inlet aperture closed position (i.e. the third inlet aperture open position), such that airflow through the mixing chamber 11 from the third inlet aperture 14 to the outlet aperture 15 is allowed and airflow through the first inlet aperture 12 and the second inlet aperture 13 is prevented. Thus, according to the first ventilation mode, only exterior air enters the intake structure 1a for filtering and subsequent heating or cooling in the air-conditioning system 100.

The first ventilation mode illustrated in FIG. 3A may be further classified as a full fresh mode or a variable fresh mode in accordance with the state of the airflow regulator 40. Specifically, in the full fresh mode, the airflow regulator 40 is controlled to provide minimum regulation of the flow rate through the third inlet aperture 14. Conversely, in the variable fresh mode, the airflow regulator 40 is controlled to regulate or attenuate the flow rate of exterior air through the third inlet aperture 14.

Figure 3B:
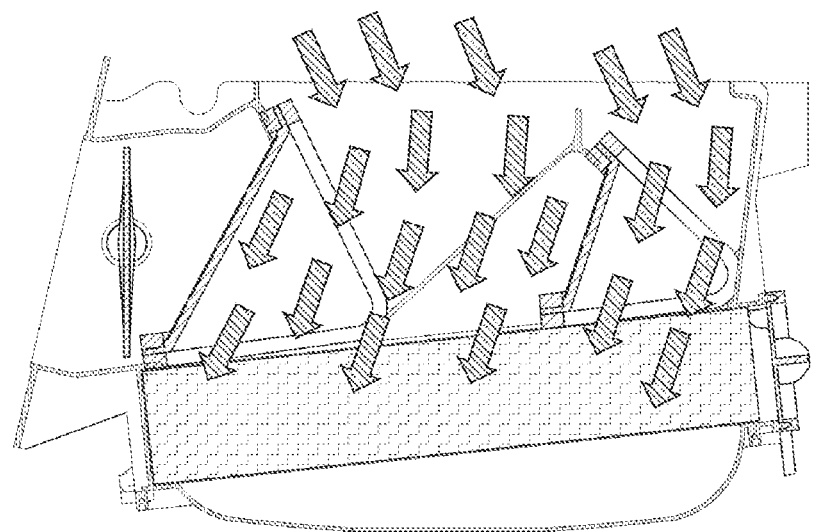
Figure 3C:
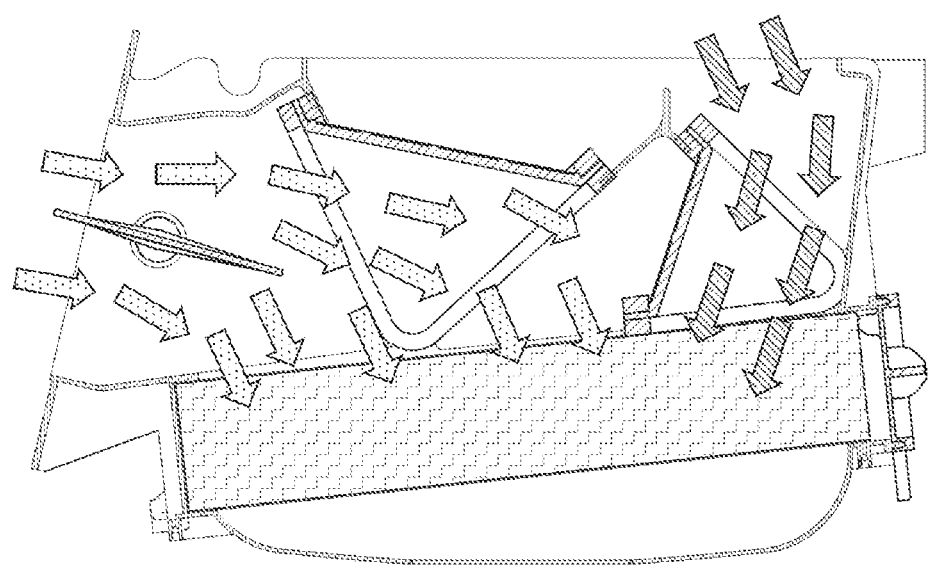

FIG. 3B illustrates the intake structure 1a of the first embodiment operating in the second ventilation mode. The second ventilation mode may also be referred to as a second mode or a recirculation mode. In the second ventilation mode, the actuator system moves the first door 20a to the first inlet aperture open position and the second door 30a to the third inlet aperture closed position (i.e. the second inlet aperture open position), such that airflow through the mixing chamber 11 from the first inlet aperture 12 and the second inlet aperture 13 to the outlet aperture 15 is allowed and airflow through the third inlet aperture 14 is prevented. Thus, according to the second ventilation mode, only interior air enters the intake structure 1a for filtering and subsequent heating or cooling in the air-conditioning system 100.

In the second ventilation mode illustrated in FIG. 3B, interior air may enter the mixing chamber 11 through both the first inlet aperture 12 and the second inlet aperture 13. However, it will be appreciated that interior air from the first inlet aperture 12 and the second inlet aperture 13 does not mix in the mixing chamber 11 due to the barrier formed by the first door 20a in the first inlet aperture open position, as described above with reference to FIG. 2. Moreover, in a variant of the second ventilation mode illustrated in FIG. 3B, the first door 20a may be in the first inlet aperture closed position, such that interior air enters the mixing chamber 11 through the second inlet aperture 13 only. However, it will be appreciated that in this variation of the second ventilation mode, the total cross-sectional area through which interior air may be drawn into the intake structure 1a is reduced.

FIG. 3C illustrates the intake structure 1a of the first embodiment operating in the third ventilation mode. The third ventilation mode may also be referred to as a third mode or a partial recirculation mode. In the third ventilation mode, the actuator system moves the first door 20a to the first inlet aperture open position and the second door 30a to the second inlet aperture closed position (i.e. the third inlet aperture open position), such that airflow through the mixing chamber 11 from the first inlet aperture 12 and the third inlet aperture 14 to the outlet aperture 15 is allowed, and airflow through the second inlet aperture 13 is prevented. Moreover, according to the third ventilation mode, airflow through the mixing chamber 11 from the third inlet aperture 14 to the first inlet aperture 12 is prevented by virtue of the barrier formed by the first door 20a in the first inlet aperture open position, as described above with reference to FIG. 2. Similarly, airflow through the mixing chamber 11 from the third inlet aperture 14 to the second inlet aperture 13 is prevented by virtue of the second door 30a in the second inlet aperture closed position. Thus, according to the third ventilation mode, exterior air and interior air may enter the intake structure 1a for subsequent filtering and heating or cooling in the air-conditioning system 100. Moreover, exterior air drawn into the intake structure 1a through the third inlet aperture 14 is prevented from venting directly to the passenger compartment of the vehicle via the first inlet aperture 12 and the second inlet aperture 13.

Figure 4:
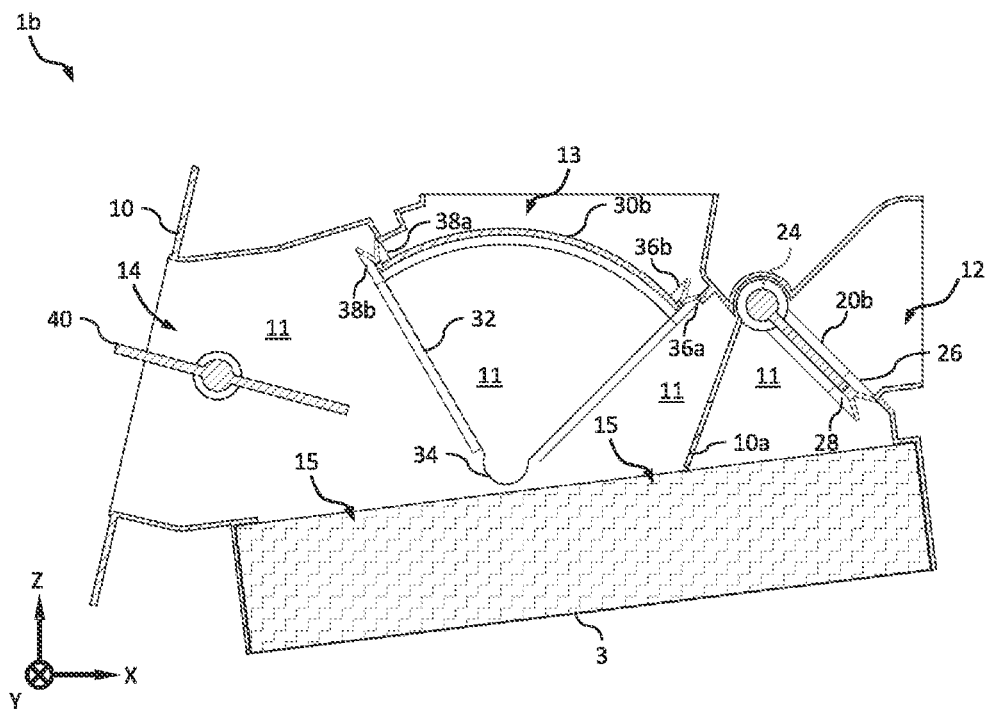
FIG. 4 is a schematic diagram showing an intake structure according to a second embodiment in cross-section.

An intake structure 1b in accordance with a second embodiment is shown in FIG. 4 in cross section. The intake structure 1b is for use with the air-conditioning system 100 shown in FIG. 1. Specifically, FIG. 4 shows the intake structure 1b in the cross-section A-A of FIG. 1 (i.e. sectioned in the X-Z plane of FIG. 1). The intake structure 1b of FIG. 4 includes a first door 20b and a second door 30b which differ with respect to the first door 20a and the second door 30a of the first embodiment described above with reference to FIG. 2. However, other aspects of the intake structure 1b shown in FIG. 4, including the case 10 and the airflow regulator 40, are substantively the same as those of the intake structure 1a according to the first embodiment shown in FIG. 2, and are thus denoted using the same reference signs and a detailed description therefore is omitted for brevity.

In the second embodiment, the first door 20b is a cantilever door and the second door 30b is a rotary door. The functionality provided by the first door 20b and the second door 30b of the intake structure 1b according to the second embodiment operate is substantively similar to the functionality provided by the first door 20a and the second door 30a of the intake structure 1a according to the first embodiment, as described in further detail below.

The first door 20b controls the flow of interior air through the first inlet aperture 12 and is moveable between a first inlet aperture closed position (shown in FIG. 4) and a first inlet aperture open position. Airflow through the first inlet aperture 12 is prevented when the first door 20b is in the first inlet aperture closed position and allowed when the first door 20b is in the first inlet aperture open position. The first door 20b is rotatable about a first rotation axis 24 (i.e. a first centre of rotation) to move between the first inlet aperture closed position and the first inlet aperture open position. The first door 20b is configured to block airflow through the first inlet aperture 12 when the first door 20b is in the first inlet aperture closed position. That is, the first door 20b substantively covers the first inlet aperture 12 when the first door 20b is in the first inlet aperture closed position. Thus, by rotation about the first rotation axis 24, the first door 20b is configured to prevent airflow through the first inlet aperture 12 when in the first inlet aperture closed position and allow airflow through the first inlet aperture 12 in the first inlet aperture open position.

The first door 20b is also configured to prevent airflow through the mixing chamber 11 from the third inlet aperture 14 to the first inlet aperture 12 in the first inlet aperture open position. That is, in the first inlet aperture open position, the first door 20b extends from the case 10, at a position between the first inlet aperture 12 and the second inlet aperture 13, to the outlet aperture 15 to partition the mixing chamber 11. That is, when the first door 20b is in the first inlet aperture open position, the first door 20b divides the mixing chamber 11 into two separate volumes and forms a barrier to block airflow between the two separate volumes. Specifically, in the first inlet aperture open position, the mixing chamber 11 is partitioned into a first volume defined by the case 10, the first inlet aperture 12, the outlet aperture 15 and the first door 20b, and a second volume defined by the case 10, the second inlet aperture 13, the third inlet aperture 14, the outlet aperture 15 and the first door 20b. In some embodiments, the case 10 may include a protrusion 10a adjacent to the air filter 3, against which the first door 20b abuts when in the first inlet aperture open position, to partition the mixing chamber 11 as discussed above. According to this configuration, exterior air drawn into the intake structure 1b through the third inlet aperture 14 is prevented from being directly ventilated to the passenger compartment of the vehicle via the first inlet aperture 12 when the first door 20b is in the first inlet aperture open position.

The second door 30b controls the flow of interior air and exterior air through the second inlet aperture 13 and the third inlet aperture 14, respectively. The second door 30b is moveable between a second inlet aperture closed position (shown in FIG. 4) and a third inlet aperture closed position. As discussed above in relation to the first embodiment, the third inlet aperture closed position may also be referred to as a second inlet aperture open position and the second inlet aperture closed position may also be referred to as a third inlet aperture open position. Similarly, as discussed above in relation to the first embodiment, the second inlet aperture closed position, the second inlet aperture open position, the third inlet aperture closed position and the third inlet aperture open position may also be termed the second inlet aperture closed orientation, the second inlet aperture open orientation, the third inlet aperture closed orientation and the third inlet aperture open orientation, respectively.

The second door 30b comprises a second support structure 32 which is rotatable about a second rotation axis 34 (i.e. second centre of rotation) to move the second door 30b between the second inlet aperture closed position and the third inlet aperture closed position. The second door 30b includes a second surface which is configured to block airflow (i.e. a second blocking surface) through the second inlet aperture 13 when the second door 30b is in the second inlet aperture closed position, and block airflow through the third inlet aperture 14 when the second door 30b is in the third inlet aperture closed position. That is, the second surface substantively covers the second inlet aperture 13 when the second door 30b is in the second inlet aperture closed position, and substantively covers the third inlet aperture 14 when the second door 30b is in the third inlet aperture closed position. Thus, by rotation of the second support structure 32 about the second rotation axis 34, the second door 30b is configured to prevent airflow through the second inlet aperture 13 and allow airflow through the third inlet aperture 14 when in the second inlet aperture closed position, and allow airflow through the second inlet aperture 13 and prevent airflow through the third inlet aperture 14 when in the third inlet aperture closed position.

As discussed above, the first door 20b according to the present embodiment is a cantilever door. In the embodiment shown in FIG. 4, the first door 20b is cantilevered about the first rotation axis 24. The first rotation axis 24 may be located substantively adjacent to the case 10, between the first inlet aperture 12 and the second inlet aperture 13.

As discussed above, the second door 30b according to the present embodiment is a rotary door. In the embodiment shown in FIG. 4, the second blocking surface of the second door 30b includes a circular arcuate surface which is coaxial with the second rotation axis 34, and the second support structure 32 is substantively fan-shaped in cross-section with its apex substantively coincident with the second rotation axis 34. That is, the second support structure 32 has a cross-cross section corresponding to the sector of a circle which is coaxial with the second rotation axis 34. Thus, for the second door 30b all points on the second blocking surface are radially distal from the second rotation axis 34 and rotate in a circumferential direction with respect to the second rotation axis 34.

The first door 20b may be provided with one or more sealing members. For example, according to the present embodiment, the first door 20b may be provided with a first sealing member 26 and a second sealing member 28. The first sealing member 26 and the second sealing member 28 are located at an end of the first door 20b which is distal from the first rotation axis 24. The first sealing member 26 and the second sealing member 28 are provided on opposite faces of the first door 20b, such that in the first inlet aperture closed position, the first sealing member 26 abuts the case 10 to prevent airflow through the first inlet aperture 12 between the case 10 and the first door 20b, and in the first inlet aperture open position, the second sealing member 28 abuts the protrusion 10a to prevent airflow between the case 10 and the first door 20b.

The second door 30b may be provided with one or more sealing members. For example, according to the present embodiment, the second door 30b may be provided with a third sealing member 36 and a fourth sealing member 38. The third sealing member 36 comprises two portions 36a, 36b which are located a first end of the second door 30b, and the fourth sealing member 38 comprises two portions 38a, 38b which are located at second end of the second door 30b, distal from the first end. In the second inlet aperture closed position, portion 36a of the third sealing member 36 abuts the case 10 to prevent airflow between the case 10 and the first end of the second door 30b, and portion 38a of the fourth sealing member 38 abuts the case 10 to prevent airflow between the case 10 and the second end of the second door 30b. In the third inlet aperture closed position, portion 36b of the third sealing member 36 abuts the case 10 to prevent airflow between the case 10 and the first end of the second door 30b, and portion 38b of the fourth sealing member 38 abuts the case 10 to prevent airflow between the case 10 and the second end of the second door 30b.

The intake structure 1b according to the second embodiment may be provided with an actuator system (not shown) which actuates the first door 20b and the second door 30b. In further embodiments, the actuator system may also actuate the airflow regulator 40 to regulate the flow rate of exterior air through the third inlet aperture 14. The actuator system may actuate the first door 20b and the second door 30b according to a first ventilation mode, a second ventilation mode, and a third ventilation mode, as illustrated in FIG. 5A, FIG. 5B and FIG. 5C, respectively.

Figure 5A:
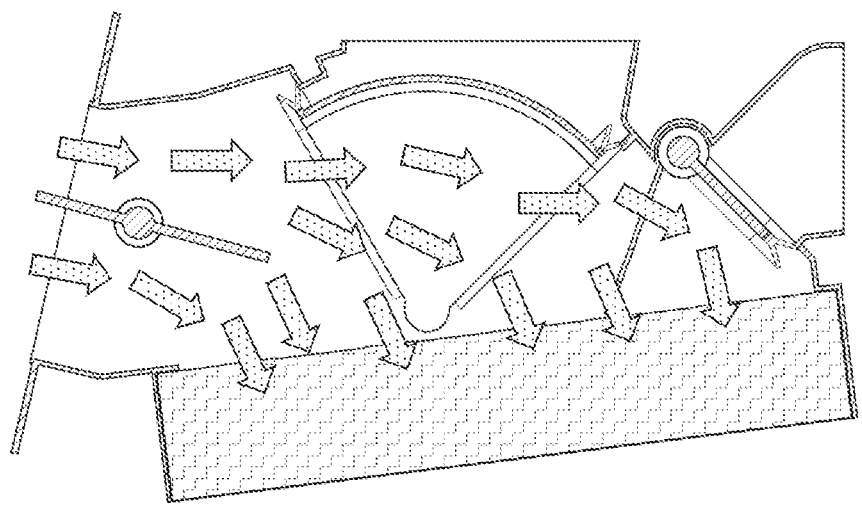
FIGS. 5A to 5C are schematic diagrams of the intake structure according to the second embodiment in a first mode, a second mode and a third mode, respectively.

FIG. 5A illustrates the intake structure 1b of the second embodiment operating in the first ventilation mode. As discussed above in relation to the first embodiment, the first ventilation mode may also be referred to as a first mode or a fresh mode. In the first ventilation mode, the actuator system moves the first door 20b to the first inlet aperture closed position and the second door 30b to the second inlet aperture closed position (i.e. the third inlet aperture open position), such that airflow through the mixing chamber 11 from the third inlet aperture 14 to the outlet aperture 15 is allowed and airflow through the first inlet aperture 12 and the second inlet aperture 13 is prevented. Thus, according to the first ventilation mode, only exterior air enters the intake structure 1b for filtering and subsequent heating or cooling in the air-conditioning system 100.

The first ventilation mode illustrated in FIG. 5A may be further classified as a full fresh mode or a variable fresh mode in accordance with the state of the airflow regulator 40. Specifically, in the full fresh mode, the airflow regulator 40 is controlled to provide minimum regulation of the flow rate through the third inlet aperture 14. Conversely, in the variable fresh mode, the airflow regulator 40 is controlled to regulate the flow rate of exterior air through the third inlet aperture 14 at a level lower than the flow rate corresponding the minimum regulation of the full fresh mode.

Figure 5B:
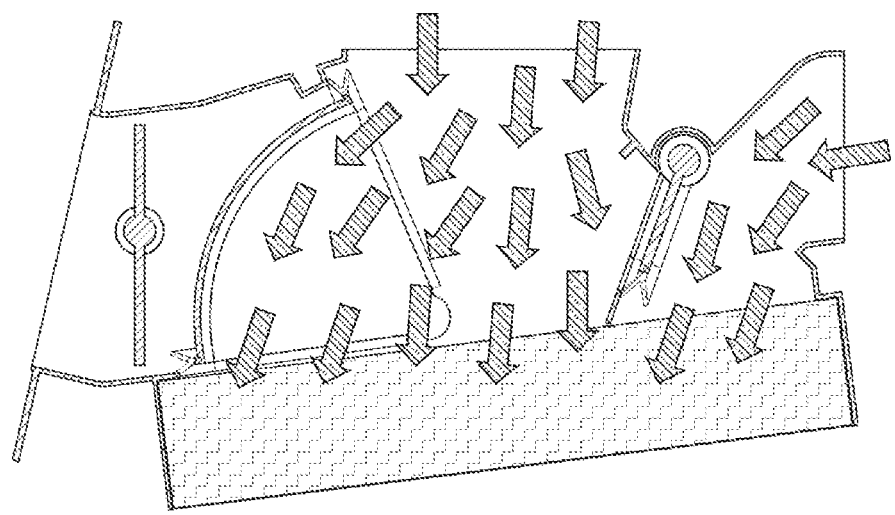
Figure 5C:
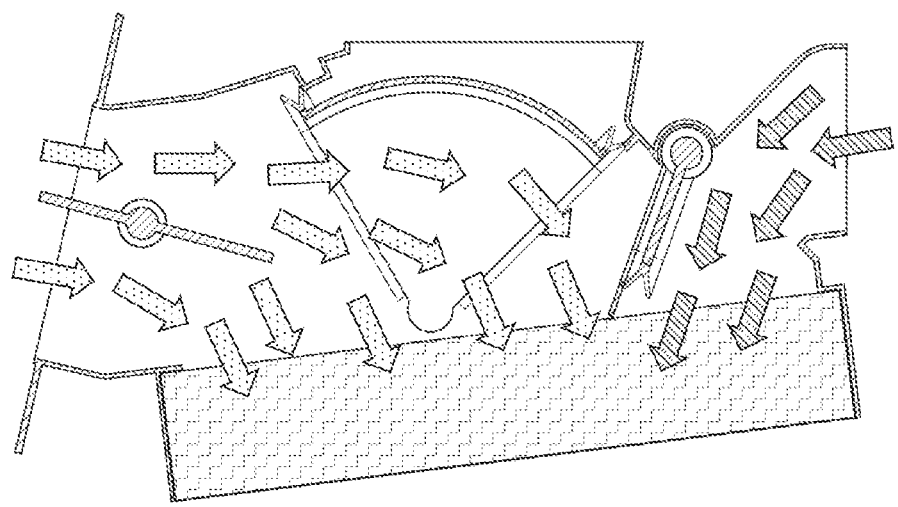

FIG. 5B illustrates the intake structure 1b of the second embodiment operating in the second ventilation mode. As discussed above in relation to the first embodiment, the second ventilation mode may also be referred to as a second mode or a recirculation mode. In the second ventilation mode, the actuator system moves the first door 20b to the first inlet aperture open position and the second door 30b to the third inlet aperture closed position (i.e. the second inlet aperture open position), such that airflow through the mixing chamber 11 from the first inlet aperture 12 and the second inlet aperture 13 to the outlet aperture 15 is allowed and airflow through the third inlet aperture 14 is prevented. Thus, according to the second ventilation mode, only interior air enters the intake structure 1b for filtering and subsequent heating or cooling in the air-conditioning system 100.

In the second ventilation mode illustrated in FIG. 5B, interior air may enter the mixing chamber 11 through both the first inlet aperture 12 and the second inlet aperture 13. However, it will be appreciated that interior air from the first inlet aperture 12 and the second inlet aperture 13 does not mix in the mixing chamber 11 due to the barrier formed by the first door 20b in the first inlet aperture open position, as described above with reference to FIG. 4. Moreover, in a variant of the second ventilation mode illustrated in FIG. 5B, the first door 20b may be in the first inlet aperture closed position, such that interior air enters the mixing chamber 11 through the second inlet aperture 13 only. However, it will be appreciated that in this variation of the second ventilation mode, the total cross-sectional area through which interior air may be drawn into the intake structure 1b is reduced.

FIG. 5C illustrates the intake structure 1b of the second embodiment operating in the third ventilation mode. As discussed above in relation to the first embodiment, the third ventilation mode may also be referred to as a third mode or a partial recirculation mode. In the third ventilation mode, the actuator system moves the first door 20b to the first inlet aperture open position and the second door 30b to the second inlet aperture closed position (i.e. the third inlet aperture open position), such that airflow through the mixing chamber 11 from the first inlet aperture 12 and the third inlet aperture 14 to the outlet aperture 15 is allowed, and airflow through the second inlet aperture 13 is prevented. Moreover, according to the third ventilation mode, airflow through the mixing chamber 11 from the third inlet aperture 14 to the first inlet aperture 12 is prevented by virtue of the barrier formed by the first door 20b in the first inlet aperture open position, as described above with reference to FIG. 4. Similarly, airflow through the mixing chamber 11 from the third inlet aperture 14 to the second inlet aperture 13 is prevented by virtue of the second door 30b in the second inlet aperture closed position. Thus, according to the third ventilation mode, exterior air and interior air may enter the intake structure 1b for subsequent filtering and heating or cooling in the air-conditioning system 100. Moreover, exterior air drawn into the intake structure 1b through the third inlet aperture 14 is prevented from venting directly to the passenger compartment of the vehicle via the first inlet aperture 12 and the second inlet aperture 13.

Figure 6:
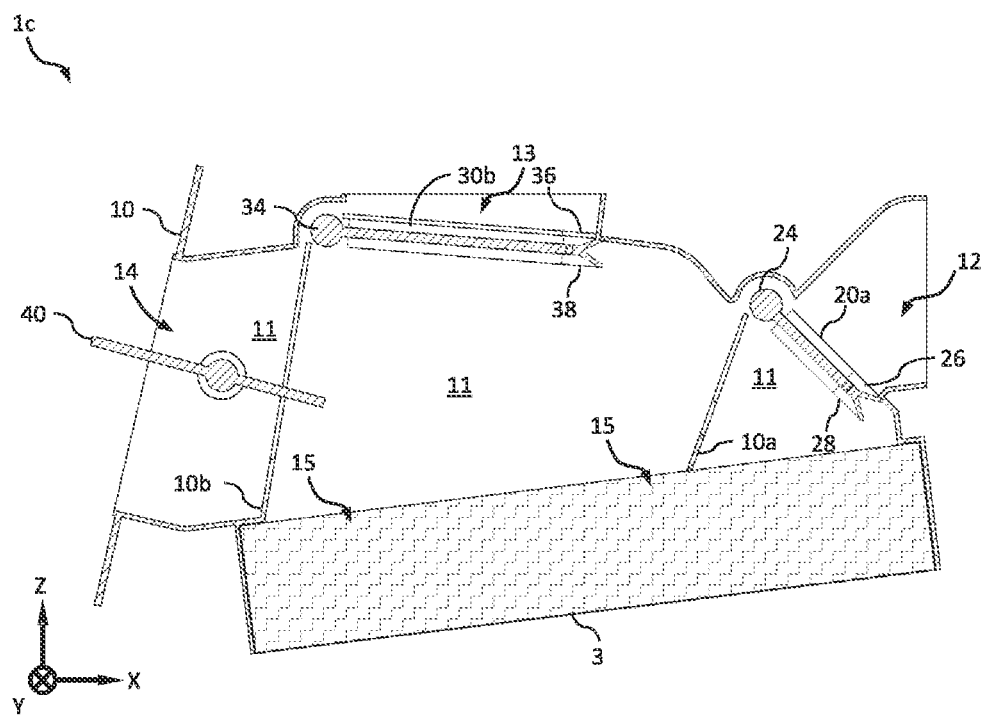
FIG. 6 is a schematic diagram showing an intake structure according to a third embodiment in cross-section.

An intake structure 1c in accordance with a third embodiment is shown in FIG. 6 in cross section. The intake structure 1c is for use with the air-conditioning system 100 shown in FIG. 1. Specifically, FIG. 6 shows the intake structure 1c in the cross-section A-A of FIG. 1 (i.e. sectioned in the X-Z plane of FIG. 1). The intake structure 1c of FIG. 6 includes a first door 20c and a second door 30c which differ with respect to the first door 20a and the second door 30a of the first embodiment described above with reference to FIG. 2. However, other aspects of the intake structure 1c shown in FIG. 4, including the case 10 and the airflow regulator 40, are substantively the same as those of the intake structure 1a according to the first embodiment shown in FIG. 2, and are thus denoted using the same reference signs and a detailed description therefore is omitted for brevity.

In the third embodiment, the first door 20c and the second door 30c are both configured as cantilever doors. Functionally and structurally, the first door 20c of the intake structure 1c according to the third embodiment operates in a similar manner to the first door 20b of the intake structure 1b according to the second embodiment, so a further detailed description of the first door 20c is omitted for brevity. The functionality provided by the second door 30c of the intake structure 1c according to the third embodiment is substantively the same as the functionality provided by the second door 30a of the intake structure 1a according to the first embodiment and the second door 30b of the intake structure 1b according to the second embodiment, as described in further detail below.

The second door 30c controls the flow of interior air and exterior air through the second inlet aperture 13 and the third inlet aperture 14, respectively. The second door 30c is moveable between a second inlet aperture closed position (shown in FIG. 6) and a third inlet aperture closed position. As discussed above in relation to the first embodiment, the third inlet aperture closed position may also be referred to as a second inlet aperture open position and the second inlet aperture closed position may also be referred to as a third inlet aperture open position. Similarly, as discussed above in relation to the first embodiment, the second inlet aperture closed position, the second inlet aperture open position, the third inlet aperture closed position and the third inlet aperture open position may also be termed the second inlet aperture closed orientation, the second inlet aperture open orientation, the third inlet aperture closed orientation and the third inlet aperture open orientation, respectively.

The second door 30c is rotatable about a second rotation axis 34 (i.e. second centre of rotation) to move the second door 30c between the second inlet aperture closed position and the third inlet aperture closed position. The second door 30c is configured to block airflow through the second inlet aperture 13 when the second door 30c is in the second inlet aperture closed position, and to block airflow through the third inlet aperture 14 when the second door 30c is in the third inlet aperture closed position. That is, the second door 30c substantively covers the second inlet aperture 13 when the second door 30c is in the second inlet aperture closed position, and substantively covers the third inlet aperture 14 when the second door 30c is in the third inlet aperture closed position. Thus, by rotation of the second door 30c about the second rotation axis 34, the second door 30c is configured to prevent airflow through the second inlet aperture 13 and allow airflow through the third inlet aperture 14 when in the second inlet aperture closed position, and allow airflow through the second inlet aperture 13 and prevent airflow through the third inlet aperture 14 when in the third inlet aperture closed position.

As discussed above, the second door 30c according to the present embodiment is a cantilever door. In the embodiment shown in FIG. 6, the second door 30c is cantilevered about the second rotation axis 34. The second rotation axis 34 may be located substantively adjacent to the case 10, between the second inlet aperture 13 and the third inlet aperture 14.

The second door 30c may be provided with one or more sealing members. For example, according to the present embodiment, the second door 30c may be provided with a third sealing member 36 and a fourth sealing member 38. The third sealing member 36 and the fourth sealing member 38 are located at an end of the second door 30c which is distal from the second rotation axis 34. The third sealing member 36 and the fourth sealing member 38 are provided on opposite faces of the second door 30c, such that in the second inlet aperture closed position, the third sealing member 36 abuts the case 10 to prevent airflow through the second inlet aperture 13 between the case 10 and the second door 30c, and in the third inlet aperture closed position, the fourth sealing member 38 abuts the case 10 to prevent airflow through the third inlet aperture 14 between the case 10 and the second door 30c.

The intake structure 1c according to the third embodiment may be provided with an actuator system (not shown) which actuates the first door 20c and the second door 30c. In further embodiments, the actuator system may also actuate the airflow regulator 40 to regulate the flow rate of exterior air through the third inlet aperture 14. The actuator system may actuate the first door 20c and the second door 30c according to a first ventilation mode, a second ventilation mode, and a third ventilation mode, as illustrated in FIG. 7A, FIG. 7B and FIG. 7C, respectively.

Figure 7A:
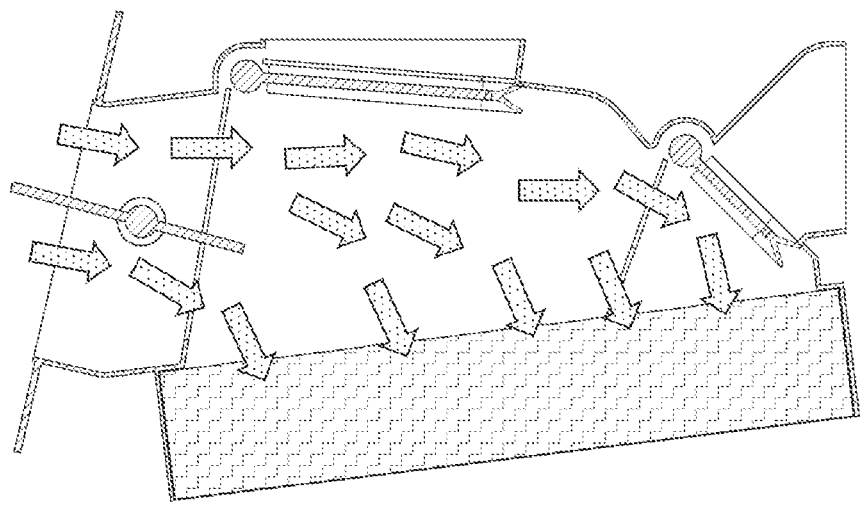
FIGS. 7A to 7C are schematic diagrams of the intake structure according to the third embodiment in a first mode, a second mode and a third mode, respectively.

FIG. 7A illustrates the intake structure 1c of the third embodiment operating in the first ventilation mode. As discussed above in relation to the first embodiment, the first ventilation mode may also be referred to as a first mode or a fresh mode. In the first ventilation mode, the actuator system moves the first door 20c to the first inlet aperture closed position and the second door 30c to the second inlet aperture closed position (i.e. the third inlet aperture open position), such that airflow through the mixing chamber 11 from the third inlet aperture 14 to the outlet aperture 15 is allowed and airflow through the first inlet aperture 12 and the second inlet aperture 13 is prevented. Thus, according to the first ventilation mode, only exterior air enters the intake structure 1c for filtering and subsequent heating or cooling in the air-conditioning system 100.

The first ventilation mode illustrated in FIG. 7A may be further classified as a full fresh mode or a variable fresh mode in accordance with the state of the airflow regulator 40. Specifically, in the full fresh mode, the airflow regulator 40 is controlled to provide minimum regulation of the flow rate through the third inlet aperture 14. Conversely, in the variable fresh mode, the airflow regulator 40 is controlled to regulate the flow rate of exterior air through the third inlet aperture 14 at a level lower than the flow rate corresponding the minimum regulation of the full fresh mode.

Figure 7B:
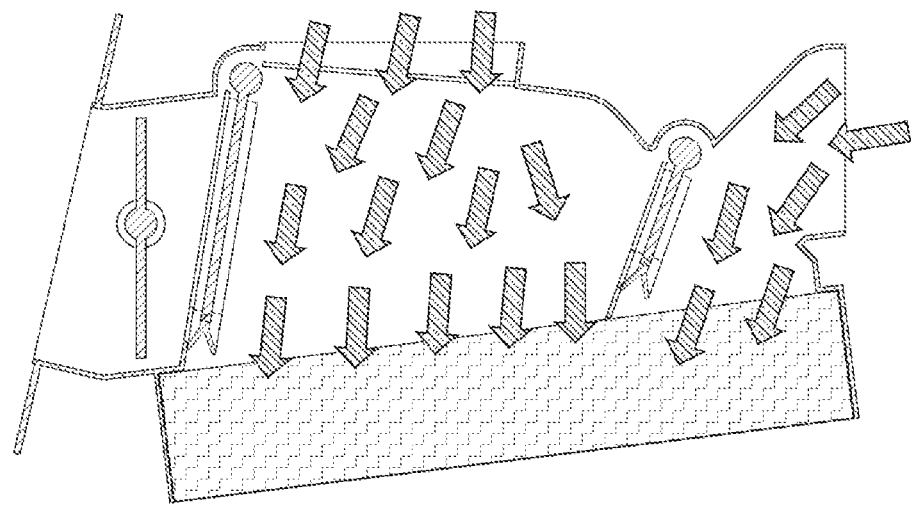
Figure 7C:
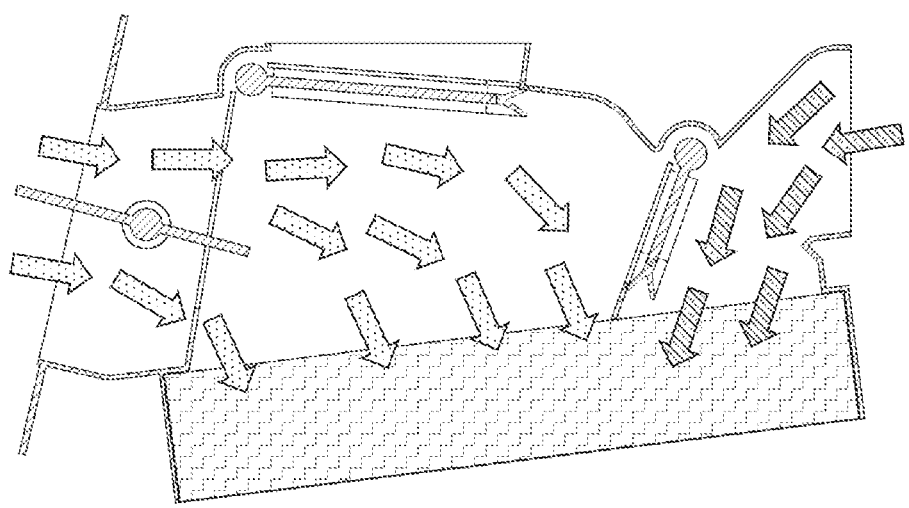

FIG. 7B illustrates the intake structure 1c of the third embodiment operating in the second ventilation mode. As discussed above in relation to the first embodiment, the second ventilation mode may also be referred to as a second mode or a recirculation mode. In the second ventilation mode, the actuator system moves the first door 20c to the first inlet aperture open position and the second door 30c to the third inlet aperture closed position (i.e. the second inlet aperture open position), such that airflow through the mixing chamber 11 from the first inlet aperture 12 and the second inlet aperture 13 to the outlet aperture 15 is allowed and airflow through the third inlet aperture 14 is prevented. Thus, according to the second ventilation mode, only interior air enters the intake structure 1c for filtering and subsequent heating or cooling in the air-conditioning system 100.

In the second ventilation mode illustrated in FIG. 7B, interior air may enter the mixing chamber 11 through both the first inlet aperture 12 and the second inlet aperture 13. However, it will be appreciated that interior air from the first inlet aperture 12 and the second inlet aperture 13 does not mix in the mixing chamber 11 due to the barrier formed by the first door 20c in the first inlet aperture open position, as described above with reference to FIG. 6. Moreover, in a variant of the second ventilation mode illustrated in FIG. 7B, the first door 20c may be in the first inlet aperture closed position, such that interior air enters the mixing chamber 11 through the second inlet aperture 13 only. However, it will be appreciated that in this variation of the second ventilation mode, the total cross-sectional area through which interior air may be drawn into the intake structure 1c is reduced.

FIG. 7C illustrates the intake structure 1c of the third embodiment operating in the third ventilation mode. As discussed above in relation to the first embodiment, the third ventilation mode may also be referred to as a third mode or a partial recirculation mode. In the third ventilation mode, the actuator system moves the first door 20c to the first inlet aperture open position and the second door 30c to the second inlet aperture closed position (i.e. the third inlet aperture open position), such that airflow through the mixing chamber 11 from the first inlet aperture 12 and the third inlet aperture 14 to the outlet aperture 15 is allowed, and airflow through the second inlet aperture 13 is prevented. Moreover, according to the third ventilation mode, airflow through the mixing chamber 11 from the third inlet aperture 14 to the first inlet aperture 12 is prevented by virtue of the barrier formed by the first door 20c in the first inlet aperture open position, as described above with reference to FIG. 6. Similarly, airflow through the mixing chamber 11 from the third inlet aperture 14 to the second inlet aperture 13 is prevented by virtue of the second door 30c in the second inlet aperture closed position. Thus, according to the third ventilation mode, exterior air and interior air may enter the intake structure 1c for subsequent filtering and heating or cooling in the air-conditioning system 100. Moreover, exterior air drawn into the intake structure 1c through the third inlet aperture 14 is prevented from venting directly to the passenger compartment of the vehicle via the first inlet aperture 12 and the second inlet aperture 13.

The door combinations disclosed above in relation to the first, second and third embodiments should not be considered restrictive, and further combinations are envisaged. For example, the first door 20b of the intake structure 1b according to the second embodiment may be a rotary door similar to the second door 30b of the intake structure 1b according to the second embodiment, or a rotary door similar to the first door 20a of the intake structure 1a according to the first embodiment.

Moreover, although the first, second and third embodiments discussed above utilise rotary and/or cantilever doors to control airflow through the first inlet aperture 12, the second inlet aperture 13 and the third inlet aperture 14, it will be appreciated that other door configurations may be employed. For example, further embodiments may employ one or more linearly actuated sliding doors to control airflow through the first inlet aperture 12, the second inlet aperture 13 and the third inlet aperture 14.

The above embodiments are to be understood as illustrative examples of the invention. Further embodiments of the invention are envisaged. For example, in some embodiments, the airflow regulator 40 may comprise a RAM door which is configured to prevent airflow through the third inlet aperture 14 when in the second RAM door position. It is to be understood that any feature described in relation to any one embodiment may be used alone, or in combination with other features described, and may also be used in combination with one or more features of any other of the embodiments. Furthermore, equivalents and modifications not described above may also be employed without departing from the scope defined in the accompanying claims.

What is claimed is:

1. An intake structure for an air-conditioning system, the intake structure comprising:
   a case defining a mixing chamber comprising a first inlet aperture, a second inlet aperture, a third inlet aperture, and an outlet aperture;
   a first door moveable between a first inlet aperture closed position and a first inlet aperture open position;
   a second door moveable between a second inlet aperture closed position and a third inlet aperture closed position; and
   an airflow regulator for regulating a flow rate of airflow through the third inlet aperture;
   wherein:
   the first door is configured to prevent airflow through the first inlet aperture in the first inlet aperture closed position, and allow airflow through the first inlet aperture and prevent airflow through the mixing chamber from the third inlet aperture to the first inlet aperture in the first inlet aperture open position;
   the second door is configured to prevent airflow through the second inlet aperture and allow airflow through the third inlet aperture in the second inlet aperture closed position, and allow airflow through the second inlet aperture and prevent airflow through the third inlet aperture in the third inlet aperture closed position; and
   the airflow regulator is configured to selectively regulate the flow rate of airflow through the third inlet aperture when the second door is in the second inlet aperture closed position.

2. The intake structure according to claim 1, wherein the first door is a rotary door which is rotatable between the first inlet aperture closed position and the first inlet aperture open position, the rotary door comprising:
   a blocking surface configured to block the first inlet aperture in the first inlet aperture closed position; and
   a support structure which supports the blocking surface and is rotatable around a rotation axis distal from the blocking surface;
   wherein the rotation axis is located closer to the outlet aperture than to the first inlet aperture.

3. The intake structure according to claim 2, wherein the blocking surface comprises a planar portion.

4. The intake structure according to claim 2, wherein the support structure together with the blocking surface is triangular or fan-shaped in cross-section.

5. The intake structure according to claim 2, wherein the blocking surface comprises a circular arcuate surface which is coaxial with the rotation axis.

6. The intake structure according to claim 1, wherein the first door is a cantilever door which is rotatable between the first inlet aperture closed position and the first inlet aperture open position, wherein the cantilever door is rotatable around a rotation axis located adjacent to the case and between the first inlet aperture and the second inlet aperture.

7. The intake structure according to claim 1, wherein the second door is a cantilever door which is rotatable between the second inlet aperture closed position and the third inlet aperture closed position, wherein the cantilever door is rotatable around a rotation axis located adjacent to the case and between the second inlet aperture and the third inlet aperture.

8. The intake structure according to claim 1, wherein the second door is configured to:
   block the second inlet aperture in the second inlet aperture closed position to prevent airflow through the second inlet aperture; and
   block the third inlet aperture in the third inlet aperture closed position to prevent airflow through the third inlet aperture.

9. The intake structure according to claim 1, wherein the case is configured to accommodate an air filter in the outlet aperture, wherein the first door is configured extend from the case to the air filter to partition the mixing chamber and prevent airflow through the mixing chamber from the third inlet aperture to the first inlet aperture in the first inlet aperture open position.

10. The intake structure according to claim 9, wherein the first door comprises a sealing member configured to abut the air filter in the first inlet aperture open position to prevent airflow between the first door and the air filter.

11. The intake structure according to claim 1, wherein the airflow regulator comprises a RAM door, the RAM door being moveable between:
   a first RAM door position which provides minimum regulation of airflow through the third inlet aperture; and
   a second RAM door position which provides maximum regulation of airflow through the third inlet aperture;
   wherein the RAM door does not prevent airflow through the third inlet aperture in the first RAM door position and in the second RAM door position.

12. The intake structure according to claim 1, wherein the airflow regulator is located in an intake duct defined by the case at a position which does not interfere with the second door in the third inlet aperture closed position.

13. An air-conditioning system for a vehicle, the air-conditioning system comprising the intake structure according to claim 1, wherein the first inlet aperture and the second inlet aperture are configured to receive airflow from inside the vehicle and the third inlet aperture is configured to receive airflow from outside the vehicle.

* * * * *